(12) United States Patent
Smith et al.

(10) Patent No.: US 6,346,987 B1
(45) Date of Patent: Feb. 12, 2002

(54) MICRO-OPTICAL POSITION INDICATOR

(75) Inventors: Paul J. Smith, Silver Spring; Steven S. Lee, Rockville, both of MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/670,340

(22) Filed: Sep. 27, 2000

(51) Int. Cl.⁷ .............................................. G01B 11/14
(52) U.S. Cl. .................. 356/614; 356/620; 250/227.11; 250/559.29
(58) Field of Search .................................. 356/614, 620, 356/615, 624; 250/559.29, 227.11, 227.21, 227.23, 227.29, 237 G, 226; 385/12; 102/202.5, 202.4, 202.6, 254

(56) References Cited

U.S. PATENT DOCUMENTS

| | | | |
|---|---|---|---|
| 3,327,584 A | * 6/1967 | Kissinger | |
| 4,236,070 A | * 11/1980 | Lee | 250/227 |
| 4,358,960 A | 11/1982 | Porter | 73/705 |
| 4,547,665 A | 10/1985 | Little et al. | 250/227 |
| 4,624,570 A | 11/1986 | Bertollini | 356/373 |
| 4,711,578 A | 12/1987 | Chaimowicz | 356/375 |
| 5,331,152 A | 7/1994 | Fenton | 250/227.11 |
| 5,420,416 A | * 5/1995 | Iida et al. | 250/227.23 |
| 5,473,156 A | * 12/1995 | Pinnock et al. | 250/227.11 |
| 5,826,616 A | 10/1998 | Golden | 137/554 |
| 5,982,494 A | 11/1999 | Hercher | 356/375 |
| 6,020,967 A | 2/2000 | Gregorio et al. | 356/375 |
| 6,173,650 B1 | * 1/2001 | Garvick et al. | 102/202.5 |

* cited by examiner

Primary Examiner—Hoa Q. Pham
(74) Attorney, Agent, or Firm—Mark Homer

(57) ABSTRACT

An optical position indicator includes a stationary base; a member having a longitudinal axis, the member being displaceable with respect to the stationary base along the longitudinal axis between a first position and a second position, the member including a reflective notch having two sides, the two sides defining respective planes that intersect the longitudinal axis at 45 degree angles; a light source; a first optical fiber mounted on the stationary base, the first optical fiber having a receiving end for receiving light from the light source and an illuminating end for illuminating the notch with a conical beam of light, the conical beam of light having a central axis and being completely intersected by one of the two sides of the notch, the central axis of the conical beam of light being perpendicular to the longitudinal axis of the member; a second optical fiber mounted on the stationary base, the second optical fiber having a receiving end for receiving light reflected from the notch when the member is in the first position, the receiving end of the second optical fiber being parallel to to the illuminating end of the first optical fiber, the second optical fiber having an indicator end; a third optical fiber mounted on the stationary base, the third optical fiber having a receiving end for receiving light reflected from the notch when the member is in the second position, the receiving end of the third optical fiber being parallel to the illuminating end of the first optical fiber, the third optical fiber having an indicator end; and an indicator for receiving light from the indicator ends of the second and third optical fibers and for indicating a position of the member.

13 Claims, 3 Drawing Sheets

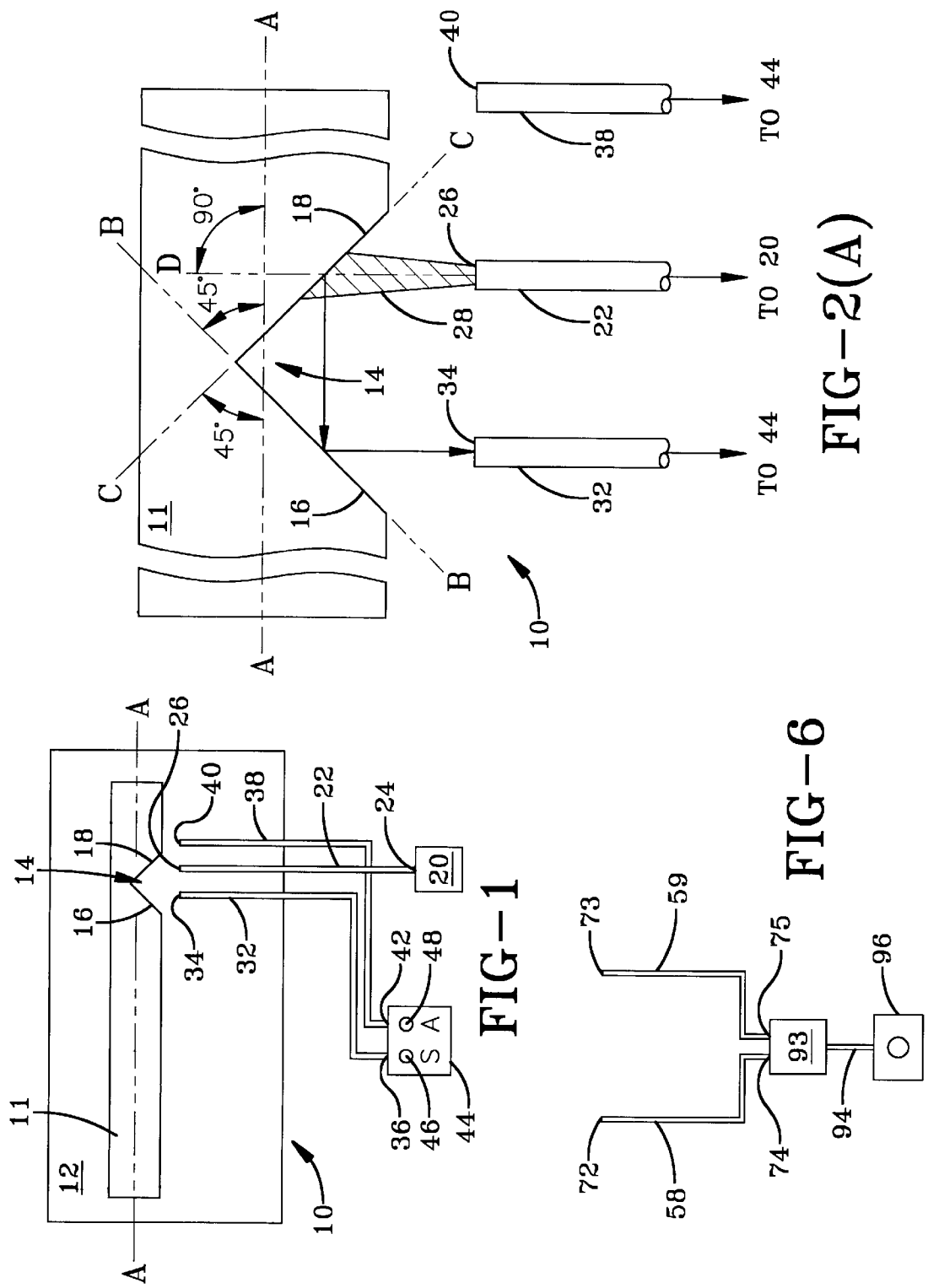

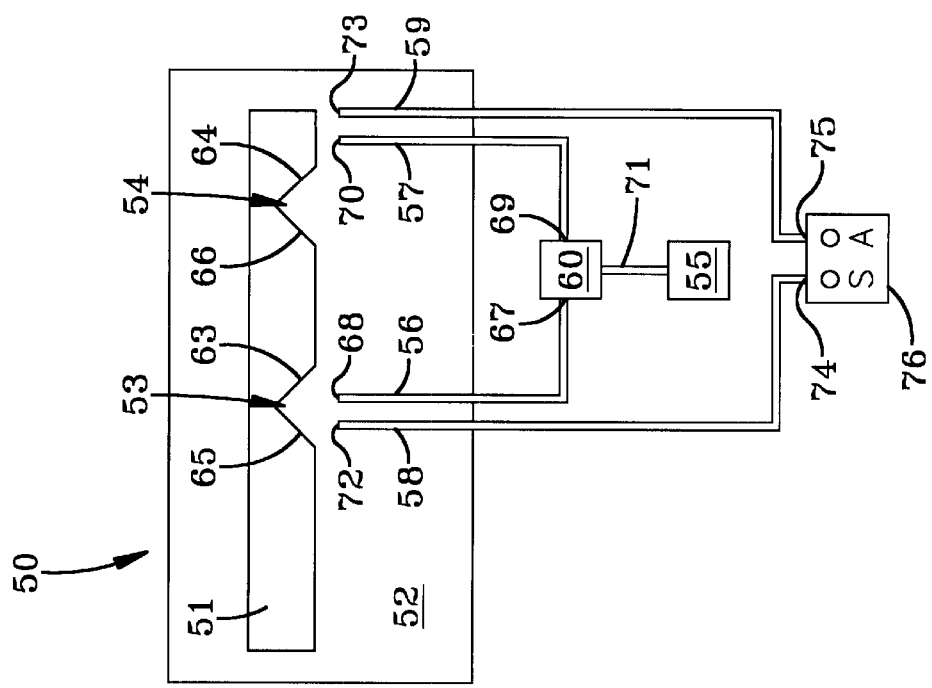
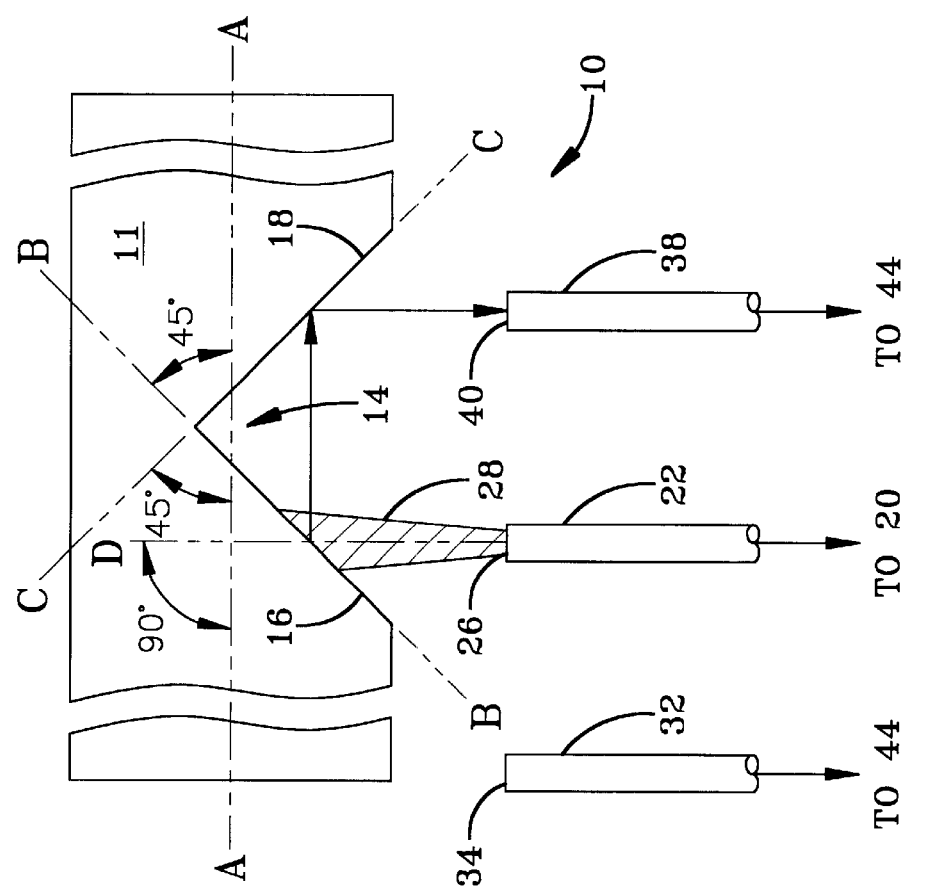
FIG-2(B)
FIG-3

MICRO-OPTICAL POSITION INDICATOR

STATEMENT OF GOVERNMENT INTEREST

The invention described herein may be manufactured and used by or for the Government of the United States of America for government purposes without the payment of any royalties therefor.

BACKGROUND OF THE INVENTION

The invention relates in general to optical position indicators and in particular to optical position indicators capable of detecting displacements on the order of 10 to 100 microns.

MicroElectroMechanical Systems (MEMS) is a technology developed in the 1980's. Various methods for determining very small changes in displacement in MEMS have been used. In one method, the device (for example, a slider/barrier) is viewed under a microscope. The microscope's objective grid markings are calibrated or compared to non-movable features of the slider and when the slider is moved, the distance traveled is compared to the objective markings.

A second method is to mount the slider on a single axis translation stage and mark the position of the slider. The slider is moved and the amount of movement of the translation stage required to return the slider to its original position is the net movement.

A third method is to attach one plate of a capacitor to the slider and the second plate of the capacitor to a stationary base. By placing a voltage on the capacitor, the change in capacitance caused by the slider moving can be measured electrically and correlated to the amount of displacement.

While the first method (microscope) allows direct observance of the moving slider, it requires bulky equipment and an optical window into the MEMS device. The microscope is acceptable for laboratory use but undesirable for real world systems. The MEMS devices may be located inside of equipment (for example, torpedoes) and impossible to observe with a microscope. The same problems occur using the translation stage method. The third method, using an influence sensor (capacitance), allows for the remote reading of the position. However, the capacitor method requires additional structures that must be added to the device (capacitor plates), a voltage that must be applied to read the position and a readout device to convert the capacitance to a displacement. The capacitor method requires an external source of power and specialized test equipment.

The goal of Safe & Arm indicators (or any simple indicator) is to give a direct reading to an observer without the use of additional equipment.

SUMMARY OF THE INVENTION

In one aspect of the present invention an optical position indicator comprises a stationary base; a member having a longitudinal axis, the member being displaceable with respect to the stationary base along the longitudinal axis between a first position and a second position, the member including a reflective notch having two sides, the two sides defining respective planes that intersect the longitudinal axis at 45 degree angles; a light source; a first optical fiber mounted on the stationary base, the first optical fiber having a receiving end for receiving light from the light source and an illuminating end for illuminating the notch with a conical beam of light, the conical beam of light having a central axis and being completely intersected by one of the two sides of the notch, the central axis of the conical beam of light being perpendicular to the longitudinal axis of the member; a second optical fiber mounted on the stationary base, the second optical fiber having a receiving end for receiving light reflected from the notch when the member is in the first position, the receiving end of the second optical fiber being parallel to the illuminating end of the first optical fiber, the second optical fiber having an indicator end; a third optical fiber mounted on the stationary base, the third optical fiber having a receiving end for receiving light reflected from the notch when the member is in the second position, the receiving end of the third optical fiber being parallel to the illuminating end of the first optical fiber, the third optical fiber having an indicator end; and an indicator for receiving light from the indicator ends of the second and third optical fibers and for indicating a position of the member.

In another aspect of the present invention an optical position indicator comprises a stationary base; a member having a longitudinal axis, the member being displaceable with respect to the stationary base along the longitudinal axis between a first position and a second position, the member including first and second reflective notches, each reflective notch having two sides, the two sides defining respective planes that intersect the longitudinal axis at 45 degree angles; a light source; a fiber optic splitter having one end for receiving light from the light source and another end that splits into first and second optical fibers, the first optical fiber being mounted on the stationary base, the first optical fiber having a receiving end for receiving light from the fiber optic splitter and an illuminating end for illuminating the first notch with a conical beam of light, the conical beam of light having a central axis and being completely intersected by one of the two sides of the first notch, the central axis of the conical beam of light being perpendicular to the longitudinal axis of the member; a third optical fiber mounted on the stationary base, the third optical fiber having a receiving end for receiving light reflected from the first notch when the member is in the first position, the receiving end of the third optical fiber being parallel to the illuminating end of the first optical fiber, the third optical fiber having an indicator end; the second optical fiber being mounted on the stationary base, the second optical fiber having a receiving end for receiving light from the fiber optic splitter and an illuminating end for illuminating the second notch with a conical beam of light, the conical beam of light having a central axis and being completely intersected by one of the two sides of the second notch, the central axis of the conical beam of light being perpendicular to the longitudinal axis of the member; a fourth optical fiber mounted on the stationary base, the fourth optical fiber having a receiving end for receiving light reflected from the second notch when the member is in the second position, the receiving end of the fourth optical fiber being parallel to the illuminating end of the second optical fiber, the fourth optical fiber having an indicator end; and an indicator for receiving light from the indicator ends of the third and fourth optical fibers and for indicating a position of the member.

In yet another aspect of the present invention an optical position indicator comprises a stationary base; a member having a longitudinal axis, the member being displaceable with respect to the stationary base along the longitudinal axis between a first position and a second position, the member including first and second notches, each notch having two sides, the two sides defining respective planes that intersect the longitudinal axis at 45 degree angles, one of the two sides having a reflective surface and the other of the two sides including a curved reflective grating for splitting white light into a spectrum; a white light source; a fiber optic splitter having one end for receiving light from the white light source and another end that splits into first and second optical fibers; the first optical fiber being mounted on the stationary base, the first optical fiber having a receiving end for receiving light from the fiber optic splitter and an illuminating end for illuminating the side of the first notch having a curved reflective grating with a conical beam of white light, the conical beam of white light having a central axis and being completely intersected by the curved reflective grating of the first notch, the central axis of the conical beam of white light being perpendicular to the longitudinal axis of the member; a third optical fiber mounted on the stationary base, the third optical fiber having a receiving end for receiving a first color of light reflected from the first notch when the member is in the first position, the receiving end of the third optical fiber being parallel to the illuminating end of the first optical fiber, the third optical fiber having an indicator end; the second optical fiber being mounted on the stationary base, the second optical fiber having a receiving end for receiving white light from the fiber optic splitter and an illuminating end for illuminating the side of the second notch having a curved reflective grating with a conical beam of white light, the conical beam of white light having a central axis and being completely intersected by the curved reflective grating of the second notch, the central axis of the conical beam of white light being perpendicular to the longitudinal axis of the member; a fourth optical fiber mounted on the stationary base, the fourth optical fiber having a receiving end for receiving a second color of light reflected from the second notch when the member is in the second position, the receiving end of the fourth optical fiber being parallel to the illuminating end of the second optical fiber, the fourth optical fiber having an indicator end; and an indicator for receiving the first and second colors of light from the indicator ends of the third and fourth optical fibers, respectively, and for indicating a position of the member.

In still another aspect of the present invention an optical position indicator comprises a stationary base; a member having a longitudinal axis, the member being displaceable with respect to the stationary base along the longitudinal axis between a first position and a second position, the member including first and second notches, each notch having two sides, the two sides defining respective planes that intersect the longitudinal axis at 45 degree angles, one of the two sides having a reflective surface and the other of the two sides including a curved reflective grating for splitting white light into a spectrum, a white light source; a fiber optic splitter having one end for receiving light from the white light source and another end that splits into first and second optical fibers; the first optical fiber being mounted on the stationary base, the first optical fiber having a receiving end for receiving light from the fiber optic splitter and an illuminating end for illuminating the side of the first notch having a curved reflective grating with a conical beam of white light, the conical beam of white light having a central axis and being completely intersected by the curved reflective grating of the first notch, the central axis of the conical beam of white light being perpendicular to the longitudinal axis of the member; a third optical fiber mounted on the stationary base, the third optical fiber having a receiving end for receiving a first color of light reflected from the first notch when the member is in the first position, the receiving end of the third optical fiber being parallel to the illuminating end of the first optical fiber, the third optical fiber having an indicator end; the second optical fiber being mounted on the stationary base, the second optical fiber having a receiving end for receiving white light from the fiber optic splitter and an illuminating end for illuminating the side of the second notch having a curved reflective grating with a conical beam of white light, the conical beam of white light having a central axis and being completely intersected by the curved reflective grating of the second notch, the central axis of the conical beam of white light being perpendicular to the longitudinal axis of the member; a fourth optical fiber mounted on the stationary base, the fourth optical fiber having a receiving end for receiving a second color of light reflected from the second notch when the member is in the second position, the receiving end of the fourth optical fiber being parallel to the illuminating end of the second optical fiber, the fourth optical fiber having an indicator end; a second fiber optic splitter having one end for receiving the first and second colors of light from the indicator ends of the third and fourth optical fibers, respectively, and another end for outputting one of the first and second colors of light, and an indicator for receiving one of the first and second colors of light from the fiber optic splitter and for indicating a position of the member.

Further objects, features and advantages of the invention will become apparent from the following detailed description taken in conjunction with the following drawing.

BRIEF DESCRIPTION OF THE DRAWING

Throughout the Figures, reference numerals that are the same refer to the same features.

FIG. 1 is a schematic top view of a first embodiment of the invention.

FIGS. 2(A) and 2(B) are enlarged schematic partial top views of the first embodiment of the invention.

FIG. 3 is a schematic top view of a second embodiment of the invention.

FIG. 6 is a schematic partial top view of a variation of the embodiment of FIGS. 5(A) and 5(B).

DETAILED DESCRIPTION OF THE PREFERRED EMBODIMENTS

Figure 4A:
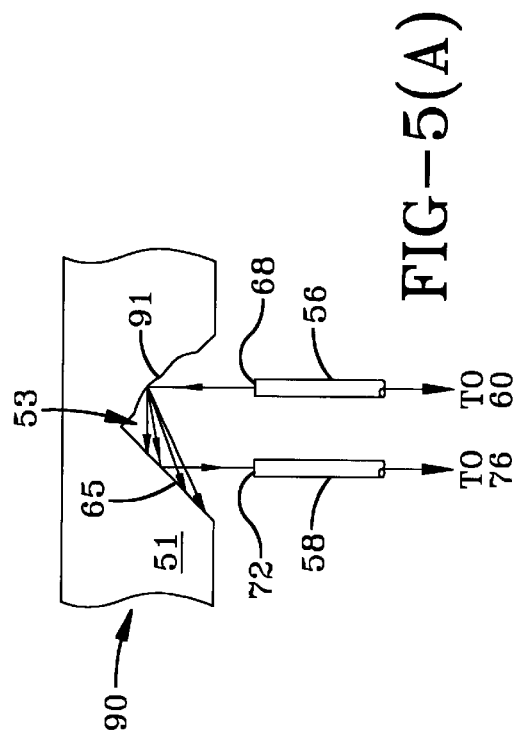
FIGS. 4(A) and 4(B) are enlarged schematic partial top views of the second embodiment of the invention.

One purpose of the invention is to provide a direct acting unaided visual indication of the position of a movable part (barrier, slider, wheel, etc) located in a MEMS. MEMS are constructed on the micron ($10^{-6}$ meter) scale and MEMS parts have movements in the range of 10 to 100 microns. The present invention allows direct visual indication of the position of a Safety & Arm (S&A) slider/barrier in a MEMS S&A system. In one position, the device is in a "Safe Mode." When the slider/barrier is moved to the second position, the device is in the "Arm Mode". By observing which optical fiber (Safe or Arm) is illuminated by light from a reflective surface, the position of the slider/barrier and hence the Safe Mode/Arm Mode of the device can be determined.

In one embodiment, one of the reflective surfaces is replaced by a reflective grating that splits the white light into color. Thus, reflected green light from the (Safe position) or red light (Arm position) can be combined onto a single fiber via a fiber optic coupler. Thus, a single output indicator fiber can be used that changes color (for example, green/red) when the device is switched from the Safe Mode to the Arm Mode.

FIG. 1 is a schematic top view of a first embodiment of a monochromatic optical position indicator 10 according to the invention. FIGS. 2(A) and 2(B) are enlarged schematic top views of the monochromatic optical position indicator 10 of FIG. 1. The monochromatic optical position indicator 10 operates with white light or a single color of light. The position indicator 10 includes a stationary base 12, a member 11, a reflective notch 14 formed in the member 11, a light source 20, first, second and third optical fibers 22,32,38, and an indicator 44. Position indicator 10 is part of a MEMS device, such as the Safe and Arm module of a slapper detonator.

Member 11 includes a longitudinal axis AA and is displaceable with respect to the stationary base 12 along the longitudinal axis AA between a first position and a second position. The first and second positions are shown in detail in FIGS. 2(A) and 2(B), respectively. In general, a distance between the first position and the second position of the member 11 is in the range of about 10 to about 100 microns. In the specific application of position indicator 10 in a slapper detonator, member 11 would correspond to the slider/barrier of the slapper detonator. The first position of the member 11 would be the Safe position and the second position of the member would be the Arm position. The member 11 may be moved by a known MEMS linear actuator.

Member 11 includes a reflective notch 14 formed therein. The member 11 is made of, for example, nickel, and is optically reflective. If the member 11 is not made of a reflective material, the notch 14 can be plated with a reflective material such as gold, aluminum, or silver. Notch 14 has two sides 16,18. The two sides 16,18 define respective planes BB,CC that intersect the longitudinal axis AA at 45 degree angles.

First, second and third optical fibers 22,32,38 are mounted on the stationary base 12 in a known manner using guide posts and alignment blocks. First optical fiber 22 has a receiving end 24 for receiving light from the light source 20 and an illuminating end 26 for illuminating the notch 14 with a conical beam of light 28. Light from the light source 20 enters the receiving end 24 of first optical fiber 22. The light source 20 may be, for example, a light emitting diode, a flashlight carried by an observer, or ambient room light. Preferably, the light source 20 is a flashlight carried by an observer or ambient room light so that a powered light source within the position indicator 10 is not required.

The light in first optical fiber 22 undergoes total internal reflection and exits fiber 22 in a cone 28 determined by the sine of the ratio of the index of refraction of the core to cladding. Because all light must exit in the cone 28, the light beam is well defined and no collimating optical elements are required. For further discussion of conical beams created by optical fibers, see U.S. Pat. No. 4,991,509 issued on Feb. 12, 1991 to Paul J. Smith, which is hereby expressly incorporated by reference. The conical beam of light 28 has a central axis D. Member 11 is located at a distance from the illuminating end 26 of first optical fiber 22 so that the conical beam 28 is completely intersected by one of the two sides 16,18 of notch 14. The central axis D of the conical beam of light 28 is perpendicular to the longitudinal axis AA of the member 11.

The second optical fiber 32 has a receiving end 34 for receiving light reflected from the notch 14 when the member 11 is in the first position (FIG. 2(A)). The receiving end 34 of the second optical fiber 32 is parallel to the illuminating end 26 of the first optical fiber 22. The second optical fiber 32 also has an indicator end 36. The third optical fiber 38 has a receiving end 40 for receiving light reflected from the notch 14 when the member 11 is in the second position (FIG. 2(B)). The receiving end 40 of the third optical fiber 38 is parallel to the illuminating end 26 of the first optical fiber 22. The third optical fiber 38 also has an indicator end 42.

The indicator 44 receives light from the indicator end 36 of the second optical fiber 32 when the member 11 is in the first position. The indicator 44 receives light from the indicator end 42 of the third optical fiber 38 when the member 11 is in the second position. Using the light transmitted by the second and third optical fibers 32,38, the indicator 44 indicates the position of the member 11. The indicator 44 may include markings, such as "Safe" and "Arm" for indicating the position of the member 11.

When member 11 is in the first position (FIG. 2(A)), the central axis D of light beam 28 strikes the reflective surface of side 18 of the notch at a forty-five degree angle. The light beam 28 is reflected and then strikes the reflective surface of side 16 of the notch at a forty-five degree angle. The light beam 28 is again reflected and strikes the receiving end 34 of the second optical fiber 32 and is then transmitted to the indicator 44. When the member 11 is moved to the second position (FIG. 2(B)), the light beam 28 is reflected from side 16 to side 18 of the notch. The light beam 28 enters the receiving end 40 of the third optical fiber 38 and is then transmitted to the indicator 44.

Figure 4B:
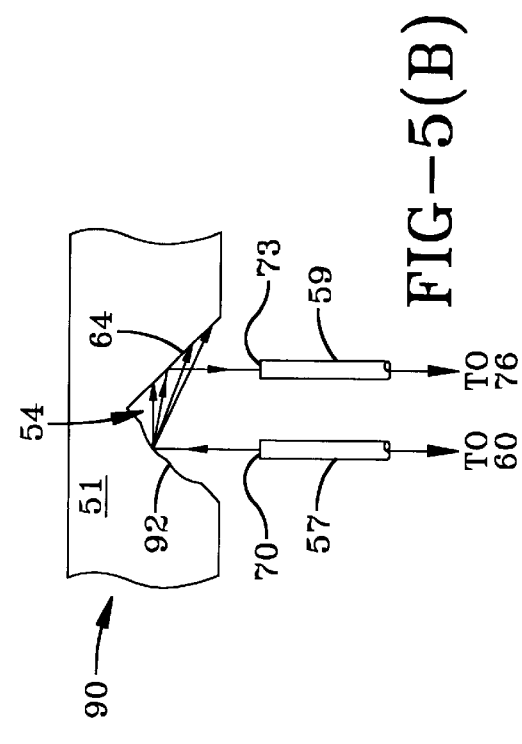

A single notch 14 in the member 11 may be sufficient for relatively short displacements of the member. For larger displacements of the member, two separate notches may be used. FIG. 3 is a schematic top view of a second embodiment of a monochromatic optical position indicator 50 according to the invention. FIGS. 4(A) and 4(B) are enlarged schematic partial top views of the second embodiment of a monochromatic optical position indicator 50 according to the invention. In the embodiment of FIGS. 3, 4(A) and 4(B), the member includes two notches. It should be understood that the methods and materials of construction of the monochromatic optical position indicator 50 are similar to those of the monochromatic optical position indicator 10.

The monochromatic optical position indicator 50 includes a stationary base 52, a member 51, two reflective notches 53,54 formed in the member 51 a light source 55, first, second, third and fourth optical fibers 56,57,58,59, a fiber optic splitter 60 and an indicator 76. Position indicator 50 is part of a MEMS device, such as the Safe and Arm module of a slapper detonator.

Member 51 includes a longitudinal axis and is displaceable with respect to the stationary base 52 along the longitudinal axis between a first position and a second position. The first and second positions are shown in detail in FIGS. 4(A) and 4(B), respectively. In general, a distance between the first position and the second position of the member 51 is in the range of about 10 to about 100 microns. In the specific application of position indicator 50 in a slapper detonator, member 51 would correspond to the slider/barrier of the slapper detonator. The first position of the member 51 would be the Safe position and the second position of the member would be the Arm position. The member 51 may be moved by a known MEMS linear actuator.

Member 51 includes first and second reflective notches 53,54. Each reflective notch 53,54 has two sides that define respective planes that intersect the longitudinal axis of member 51 at 45 degree angles. Notch 53 has sides 63,65 and notch 54 has sides 64,66.

First, second, third and fourth optical fibers 56,57,58,59 are mounted on the stationary base 52. First optical fiber 56 has a receiving end 67 for receiving light from the fiber optic splitter 60 and an illuminating end 68 for illuminating the notch 53 with a conical beam of light. Second optical fiber 57 has a receiving end 69 for receiving light from the fiber optic splitter 60 and an illuminating end 70 for illuminating the notch 54 with a conical beam of light. Light from the light source 55 passes through a light source fiber optic 71 to the fiber optic splitter 60. The light then passes to the receiving ends 67,69 of the first and second optical fibers 56,57. The light source 55 may be the same as light source 20 discussed above.

The light in first and second optical fibers 56,57 undergoes total internal reflection and exits fibers 56,57 in a cone. Member 51 is located at a distance from the illuminating ends 68,70 of first and second optical fibers 56,57 so that the conical beam is completely intersected by one of the two sides of each notch 53,54. The third optical fiber 58 has a receiving end 72 for receiving light reflected from the notch 53 when the member 51 is in the first position. The fourth optical fiber 59 has a receiving end 73 for receiving light reflected from the notch 54 when the member 51 is in the second position. The receiving ends 72,73 of the third and fourth optical fibers 58,59 are parallel to the illuminating ends 68,70 of the first and second optical fibers 56,57, respectively. The third and fourth optical fibers 58,59 also have indicator ends 74,75.

The indicator 76 receives light from the indicator end 74 of the third optical fiber 58 when the member 51 is in the first position. The indicator 76 receives light from the indicator end 75 of the fourth optical fiber 59 when the member 51 is in the second position. Using the light transmitted by the third and fourth optical fibers 58,59, the indicator 76 indicates the position of the member 51. The indicator 76 may include markings, such as "Safe" and "Arm" for indicating the position of the member 51.

When member 51 is in the first position (FIG. 4(A)), the light beam strikes the reflective surface of side 63 of the notch 53 at a forty-five degree angle. The light beam is reflected and then strikes the reflective surface of side 65 of the notch 53 at a forty-five degree angle. The light beam is again reflected and strikes the receiving end 72 of the third optical fiber 58 and is then transmitted to the indicator 76. When the member 51 is moved to the second position (FIG. 4(B)), the light beam is reflected from side 66 to side 64 of the notch 54. The light beam enters the receiving end 73 of the fourth optical fiber 59 and is then transmitted to the indicator 76.

Figure 5A:
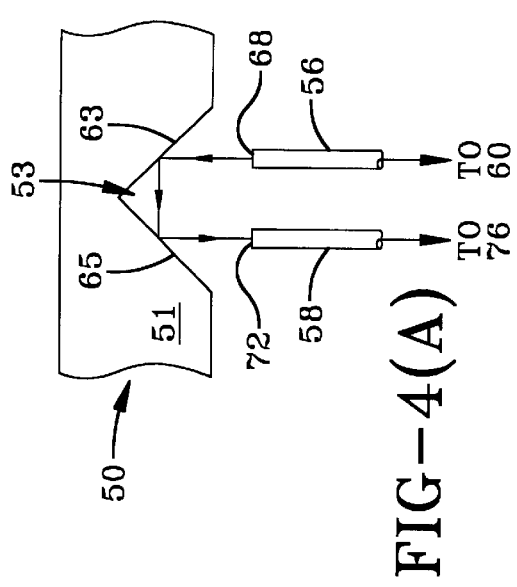
FIGS. 5(A) and 5(B) are schematic partial top views of a third embodiment of the invention.
Figure 5B:
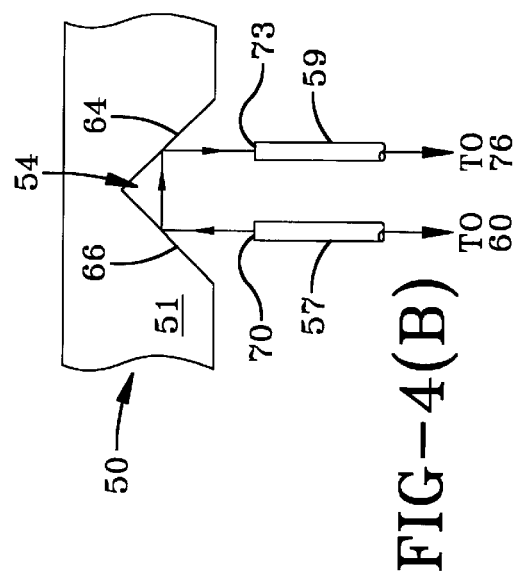

FIGS. 5(A) and 5(B) are schematic partial top views of a third embodiment of a color optical position indicator 90 according to the invention. The construction of color indicator 90 is similar to that of monochromatic indicator 50. Only the differences between the two embodiments will be discussed. In color indicator 90, the reflecting sides 63,66 of notches 53,54 are replaced with curved reflective gratings 91,90. The curved reflective ratings 91,92 split the incident white light from first and second optical fibers 56,57 into a color spectrum. The color spectrum is reflected onto sides 65,64 of notches 53,54. Sides 65,64 then reflect the different colors of the spectrum towards the receiving ends 72,73 of third and fourth optical fibers 58,59.

The longitudinal positions of the third and fourth optical fibers 58,59 determine which color of light is received. In FIG. 5(A), the member 51 is in the first or safe position. Thus, the third optical fiber 58 may be positioned to receive green light reflected from side 65 and transmit the green light to the indicator 76 to illuminate a Safe indicator. In FIG. 5(B), the member 51 is in the second or arm position.

Thus, the fourth optical fiber 59 may be positioned to receive red light reflected from side 64 and transmit the red light to the indicator 76 to illuminate an Arm indicator. It should be understood that green and red are exemplary colors. An color of the spectrum may be chosen and utilized by changing the position of the third and fourth optical fibers 58,59.

FIG. 6 is a schematic partial top view of a variation of the embodiment of FIGS. 5(A) and 5(B). In FIG. 6, the third and fourth optical fibers 58,59 are combined with a second fiber optic splitter 93. A single indicator fiber 94 connects the second fiber optic splitter 93 to an indicator 96. The color of the light radiating from the single indicator fiber 94 changes when the member 51 is moved from the first position to the second position (i.e., green light to indicate "Safe Mode" and red light to indicate "Arm Mode").

The present invention provides several advantages over other position indicators. The invention is a direct reading device wherein the observed light is reflected directly off the member. No special readout device is required. The invention exerts no mechanical force or influence on the member to affect its motion or mechanical/electrical properties.

Incorporation of the invention into present slider/barriers requires no significant design changes. Present slider/barriers are plated nickel and reflective by nature thus requiring no change. If a non-reflective slider/barrier is used, a reflective coating can be applied. The reflecting surfaces and curved reflective gradient surfaces are integral parts of the device and not added on to the slider. Because the slider/barrier is made by a photolithography process, the use of reflective surfaces and/or curved reflective gradient surfaces does not add cost.

The invention is immune to mal-assembly because if the slider/barrier is not installed, there is no reflective surface and, therefore, no light/color is observed at the indicator. The use of fiber optic cable enables the indicator to be remotely located from slider/barrier. This results in less restriction on device location and packaging. The invention is EMI/RFI (ElectroMagnetic Interference/Radio Frequency Interference) immune. The fiber optic cable is made from glass or plastic, which is non-conductive. The non-conductive and inert characteristics of the invention make it highly desirable for harsh environments (salt water) and explosive devices.

While the invention has been described with reference to certain preferred embodiments, numerous changes, alterations and modifications to the described embodiments are possible without departing from the spirit and scope of tie invention as defined in the appended claims, and equivalents thereof.

What is claimed is:

1. An optical position indicator, comprising:
   a stationary base;
   a member having a longitudinal axis, the member being displaceable with respect to the stationary base along the longitudinal axis between a first position and a second position, the member including a reflective notch having two sides, the two sides defining respective planes that intersect the longitudinal axis at 45 degree angles;
   a light source;
   a first optical fiber mounted on the stationary base, the first optical fiber having a receiving end for receiving light from the light source and an illuminating end for illuminating the notch with a conical beam of light, the conical beam of light having a central axis and being completely intersected by one of the two sides of the notch, the central axis of the conical beam of light being perpendicular to the longitudinal axis of the member;

a second optical fiber mounted on the stationary base, the second optical fiber having a receiving end for receiving light reflected from the notch when the member is in the first position, the receiving end of the second optical fiber being parallel to the illuminating end of the first optical fiber, the second optical fiber having an indicator end;

a third optical fiber mounted on the stationary base, the third optical fiber having a receiving end for receiving light reflected from the notch when the member is in the second position, the receiving end of the third optical fiber being parallel to the illuminating end of the first optical fiber, the third optical fiber having an indicator end; and an indicator for receiving light from the indicator ends of the second and third optical fibers and for indicating a position of the member.

2. The optical position indicator of claim 1 wherein the member is a slider for a Safe & Arm device.

3. The optical position indicator of claim 1 wherein a distance between the first position and the second position of the member is in the range of about 10 to about 100 microns.

4. The optical position indicator of claim 1 wherein the first position of the member is a safe position and the second position of the member is an arm position.

5. An optical position indicator, comprising:

a stationary base;

a member having a longitudinal axis, the member being displaceable respect to the stationary base along the longitudinal axis between a first position and a second position, the member including first and second reflective notches, each reflective notch having two sides, the two sides defining respective planes that intersect the longitudinal axis at 45 degree angles;

a light source;

a fiber optic splitter having one end for receiving light from the light and another end that splits into first and second optical fibers;

the first optical fiber being mounted on the stationary base, the first optical fiber having a receiving end for receiving light from the fiber optic splitter and an illuminating end for illuminating the first notch with a conical beam or light, the conical beam of light having a central axis and being completely intersected on one of the two sides of the first notch, the central axis of the conical beam of light being perpendicular to the longitudinal axis of the member;

a third optical fiber mounted on the stationary base, the third optical fiber having a receiving end for receiving light reflected from the first notch when the member is in the first position, the receiving end of the third optical fiber being parallel to the illuminating end of the first optical fiber, the third optical fiber having an indicator end:

the second optical fiber being mounted on the stationary base, the second optical fiber having a receiving end for receiving light from the fiber optic splitter and an illuminating longitudinal end for illuminating the second notch with a conical beam of light, the conical beam of light having a central axis and being completely intersected by one of the two sides of the second notch, the central axis of the conical beam of light being perpendicular to the longitudinal axis of the member;

a fourth optical fiber mounted on the stationary base, the fourth optical fiber having a receiving end for receiving light reflected from the second notch when the fiber is all the second position, the receiving end of the fourth optical fiber being parallel to the illuminating end of the second optical fiber, the fourth optical fiber having an indicator end; and an indicator for receiving light from the indicator ends of the third and fourth optical fibers and for indicating a position of the member.

6. The optical position indicator of claim 5 wherein the member is a slider for a Safe & Arm device.

7. The optical position indicator of claim 5 wherein a distance between the first position and the second position of the member is in the range of about 10 to about 100 microns.

8. The optical position indicator of claim 5 wherein the first position of the member is a safe position and the second position of the member is an arm position.

9. An optical position indicator, comprising:

a stationary base;

a member having a longitudinal axis, the member being displaceable with respect to the stationary base along the longitudinal axis between a first position and a second position, the member including first and second notches, each notch having two sides, the two sides defining respective planes that intersect the longitudinal axis at 45 degree angles, one of the two sides having a reflective surface and the other of the two sides including a curved reflective grating for splitting white light into a spectrum;

a white light source;

a fiber optic splitter having one end for receiving light from the white light source and another end that splits into first and second optical fibers;

the first optical fiber being mounted on the stationary base, the first optical fiber having a receiving end for receiving light from the fiber optic splitter and an illuminating, end for illuminating the side of the first notch having a curved reflective grating with a conical beam of white light, the conical beam of white light having a central axis and being completely intersected by the curved reflective grating of the first notch, the central axis of the conical beam of white light being perpendicular to the longitudinal axis of the member;

a third optical fiber mounted on the stationary base, the third optical fiber having a receiving end for receiving a first color of light reflected from the first notch when the member is in the first position, the receiving end of the third optical fiber being parallel to the illuminating end of the first optical fiber, the third optical fiber having an indicator end;

the second optical fiber being mounted on the stationary base, the second optical fiber having a receiving end for receiving white light from the fiber optic splitter and an illuminating end for illuminating the side of the second notch having, a curved reflective grating with a conical beam of white light, the conical beam of white light having a central axis and being completely intersected by the curved reflective grating of the second notch, the central axis of the conical beam of white light being perpendicular to the longitudinal axis of the member.

a fourth optical fiber mounted on the stationary base the fourth optical fiber having a receiving end for receiving a second color of light reflected from the second notch when the member is in the second position, the receiving end of the fourth optical fiber being parallel to the illuminating end of the second optical fiber, the fourth optical fiber having all indicator end; and an indicator for receiving the first and second colors of light from the indicator ends of the third and fourth optical fibers, respectively and for indicating a position of the member.

10. The optical position indicator of claim 9 wherein the member is a slider for a Safe & Arm device.

11. The optical position indicator of claim 9 wherein a distance between the first position and the second position of the member is in the range of about 10 to about 100 microns.

12. The optical position indicator of claim 9 wherein the first position of the member is a safe position and the second position of the member is an arm position.

13. An optical position indicator, comprising:

a stationary base;

a member having a longitudinal axis, the member being displaceable with respect to the stationary base along the longitudinal axis between at first position and a second position, the member including first and second notches, each notch having two sides, the two sides defining respective planes that intersect the longitudinal axis at 45 degree angles, one of the two sides having a reflective surface and the other of the two sides including a curved reflective grating for splitting white light into a spectrum;

a white light source;

a fiber optic splitter having one end for receiving light from the white light source and another end that splits into first and second optical fibers;

the first optical fiber being mounted on the stationary base, the first optical fiber having a receiving end for receiving light from the fiber optic splitter and an illuminating, end for illuminating the side of the first notch having a curved reflective grating with a conical beam of white light, the conical beam of white light having a central axis and being completely intersected by the curved reflective grating of the first notch, the central axis of the conical beam of white light being perpendicular to the longitudinal axis of the member;

a third optical fiber mounted on the stationary base, the third optical fiber having a receiving end for receiving a first color of light reflected horn the first notch when the member is in the first position, the receiving end of the third optical fiber being parallel to the illuminating end of the first optical fiber, the third optical fiber having an indicator end;

the second optical fiber being mounted on the stationary base, the second optical fiber having a receiving end for receiving white light from the fiber optic splitter and an illuminating end for illuminating the side of the second notch having a curved reflective grating with a conical beam of white light, the conical beam of white light having a central axis and being completely intersected by the curved reflective grating of the second notch, the central axis of the conical beam of white light being perpendicular to the longitudinal axis of the member;

a fourth optical fiber mounted on the stationary base, the fourth optical fiber having a receiving end for receiving a second color of light reflected from the second notch when the member is in the second position, the receiving end of the fourth optical fiber being parallel to the illuminating end of the second optical fiber, the fourth optical fiber having an indicator end;

a second fiber optic splitter having one end for receiving the first and second colors of light from the indicator ends of the third and fourth optical fibers, respectively, and another end for outputting one of the first and second colors of light; and an indicator for receiving one of the first and second colors of light from the fiber optic splitter and for indicating a position of the member.

* * * * *